(12) United States Patent
Berthilsson et al.

(10) Patent No.: US 10,687,044 B2
(45) Date of Patent: Jun. 16, 2020

(54) METHOD AND ARRANGEMENT FOR CALIBRATION OF CAMERAS

(71) Applicant: Cognimatics AB, Lund (SE)

(72) Inventors: Rikard Berthilsson, Lund (SE); Siri Dovner, Lund (SE); Håkan Ardö, Lund (SE)

(73) Assignee: Cognimatics AB, Lund (SE)

(*) Notice: Subject to any disclaimer, the term of this patent is extended or adjusted under 35 U.S.C. 154(b) by 0 days.

(21) Appl. No.: 15/575,779

(22) PCT Filed: May 20, 2016

(86) PCT No.: PCT/EP2016/061445
§ 371 (c)(1),
(2) Date: Nov. 20, 2017

(87) PCT Pub. No.: WO2016/185024
PCT Pub. Date: Nov. 24, 2016

(65) Prior Publication Data
US 2018/0124380 A1 May 3, 2018

(30) Foreign Application Priority Data

May 20, 2015 (SE) ...................................... 1550637

(51) Int. Cl.
*H04N 13/246* (2018.01)
*G06T 7/80* (2017.01)
(Continued)

(52) U.S. Cl.
CPC ............. *H04N 13/246* (2018.05); *G06T 7/13* (2017.01); *G06T 7/74* (2017.01); *G06T 7/85* (2017.01); *H04N 1/00* (2013.01); *H04N 13/239* (2018.05)

(58) Field of Classification Search
CPC .................................................... H04N 13/246
(Continued)

(56) References Cited

U.S. PATENT DOCUMENTS

| 2006/0024041 A1* | 2/2006 | Lou | ........................ G06K 9/209 396/213 |
| 2011/0176734 A1* | 7/2011 | Lee | ..................... G06K 9/00671 382/197 |

(Continued)

OTHER PUBLICATIONS

"Speeded-Up Robust Features (SURF)", Bay et al.; Computer Vision and Image Understanding, Academic Press, US, vol. 110, No. 3, (Jun. 1, 2008), pp. 346-359, XP022652944 [retrieved on Dec. 15, 2007].

(Continued)

*Primary Examiner* — Joseph G Ustaris
*Assistant Examiner* — Amir Shahnami
(74) *Attorney, Agent, or Firm* — Volpe and Koenig, P.C.

(57) ABSTRACT

A method and arrangement for calibrating stereo cameras. A first image from a first camera is received, and a second image is received from a second camera, the first image and the second image comprise an overlap. One or more candidate points of the first image and of the second image are determined in the overlap. The candidate points of the first image are matched with the candidate points of the second image and pairs of corresponding candidate points are determined. A homography of the first camera is calculated based on the pairs of corresponding candidate points and a homography of the second camera is calculated based on the pairs of corresponding candidate points. The first camera and the second camera are calibrated by adjusting an intrinsic parameter or an extrinsic parameter of each respective camera, based on the calculated homography of each respective camera.

14 Claims, 5 Drawing Sheets

(51) Int. Cl.
*H04N 1/00* (2006.01)
*H04N 13/239* (2018.01)
*G06T 7/73* (2017.01)
*G06T 7/13* (2017.01)

(58) Field of Classification Search
USPC .......................................................... 348/148
See application file for complete search history.

(56) References Cited

U.S. PATENT DOCUMENTS

| | | | | |
|---|---|---|---|---|
| 2013/0235213 A1* | 9/2013 | Kennedy | ................... | G06T 7/85 348/187 |
| 2014/0037189 A1* | 2/2014 | Ziegler | ................... | G06T 17/00 382/154 |
| 2014/0098194 A1* | 4/2014 | Goma | ................ | H04N 5/23212 348/47 |
| 2014/0118501 A1* | 5/2014 | Kim | ......................... | G06T 7/85 348/46 |
| 2016/0277650 A1* | 9/2016 | Nagaraja | ................ | H04N 5/217 |

OTHER PUBLICATIONS

"A Multiple-Camera System Calibration Toolbox Using a Feature Descriptor-Based Calibration Pattern", Li et al.; 2013 IEEE/RSJ International Conference on Intelligent Robots and Systems, IEEE (Nov. 3, 2013), pp. 1301-1307, XP032537577 [retrieved on Dec. 26, 2013].

"Homography-Based Extrinsic Self-Calibration for Camera in Automotive Applications", Miksch et al., Workshop on Intelligent Transportation 2010 (Mar. 1, 2010), pp. 17-22, XP055030562.

"A Flexible New Technique for Camera Calibration", Zhengyou Zhang, IEEE Transactions on Pattern Analysis and Machine Intelligence, vol. 22, No. 11 (Nov. 1, 2000), p. 1330, XP055037019.

"Combining Line and Point Correspondences for Homography Estimation", Elan Dubrofsky et al., In: "Advances in Visual Computing: 4th International Symposium, ISVC 2008; Las Vegas, NV, USA, Dec. 1-3, 2008, Proceedings, Part II" (Jan. 1, 2008) Springer Berlin Heidelberg, XP055296752, vol. 5359, pp. 202-213.

"Self-Calibration of a Stereo Vision System for Automotive Applications", Broggi et al., Proceedings of the 2001 IEEE International Conference on Robotics and Automation, ICRA 2001, Seoul, Korea, May 21-26, 2001; [Proceedings of the IEEE Internat'l Conf. on Robotics and Automation] New York, NY (May 21, 2011); pp. 3698-3703, XP0105507213.

International Search Report for PCT/EP2016/061445 (dated Sep. 15, 2016).

* cited by examiner

METHOD AND ARRANGEMENT FOR CALIBRATION OF CAMERAS

TECHNICAL FIELD

The present disclosure relates to camera arrangements, especially it relates to methods for performing calibration of cameras in stereo camera arrangements.

BACKGROUND

With emergence of digital camera technology, cameras have been popular to utilise for a plurality of purposes. Today cameras are used widely not only for photography but also for new purposes. Surveillance of public areas or private property has become popular to utilise cameras for. Digital camera technology is also applied for monitoring, navigation, etc. Computer vision is a technical field where a stereo camera arrangement is utilised for imaging a scene.

In stereo camera arrangements two cameras are used to produce a 3D (Three dimensional) image or model of an environment or scene. In a stereo camera arrangement two cameras are rectified towards a scene from two different directions and there is a distance between the cameras. By rectifying the cameras with a plurality of angles between them, information of a distance to an object could be determined. To simulate the human vision, a suitable distance between the cameras is between 5 and 10 cm which correspond to the distance between the left and the right eye of a person.

The cameras of a stereo camera arrangement will be calibrated to operate properly. Intrinsic parameters of the cameras will be adjusted when calibrating the cameras, where typical intrinsic parameters to adjust are direction, focus, etc.

Traditionally, intrinsic parameters of cameras for stereo purposes have been set when manufacturing stereo camera arrangements. Alternatively, the intrinsic parameters may be manually set in conjunction with installation of the cameras, and manual adjustments thereof will be performed when needed.

However, due to the fact that the amount of stereo camera arrangements increases, there are a large number of cameras to adjust intrinsic parameters for. In addition, new applications have been developed and stereo camera arrangements have been popular to use also in environments where the physical conditions require regular adjustments of intrinsic parameters. For instance, stereo camera arrangements in vehicles will typically be affected by shaking and may need to be adjusted during transport to operate properly.

With reference to the FIGS. 1a-b, which are schematic illustration views, a stereo camera arrangement will now be described in accordance with one example. In FIG. 1a the stereo camera arrangement is illustrated in a perspective view, and in FIG. 1b, the same stereo camera arrangement is illustrated from above.

The stereo camera arrangement 100 comprises a first camera 102 and a second camera 104. Both the first camera 102 and the second camera 104 are respectively connected to a control unit 106 (not shown in FIG. 1b). The cameras 102, 104 are arranged to capture respective images of a scene 108. The control unit 106 is arranged to calibrate the cameras 102, 104.

Today, some methods are applied for calibration of stereo cameras. These known methods are quite complex and require a substantial amount of calculation capacity or additional references. For instance, Nedevschi et al. (On-Line Calibration Method for Stereovision Systems Used in Vehicle Applications) present a method where markers on a road are captured by two cameras. Hansen et al. (Online Continuous Stereo Extrinsic Parameter Estimation) present a method where a baseline is determined.

Thus, there is a problem to devise a cost-effective and flexible method for appropriate calibration of cameras in stereo camera arrangements.

SUMMARY

It is an object of the teachings of this application to overcome the problems listed above by providing a method for calibrating a first camera with respect to a second camera. The method comprises receiving a first image from the first camera, and receiving a second image from the second camera, wherein both the first image and the second image comprises an overlap. Furthermore, the method comprises determining one or more candidate points of the first image in the overlap, and determining one or more candidate points of the second image in the overlap. Moreover, the method comprises matching the candidate points of the first image with the candidate points of the second image and determining pairs of corresponding candidate points. The method comprises also calculating a homography of the first camera based on the pairs of corresponding candidate points, and calibrating the first camera by adjusting an intrinsic parameter or an extrinsic parameter of the first camera, based on the calculated homography of the first camera. The method further comprises calculating a homography of the second camera based on the pairs of corresponding candidate points, and the second camera is calibrated by adjusting an intrinsic parameter or an extrinsic parameter of the second camera, based on the calculated homography of the second camera. A feature detection algorithm, such as a Harris algorithm may be utilized for detecting the candidate points, e.g. corners, or intersections.

It is also an object of the teachings of this application to overcome the problems listed above by providing a stereo camera arrangement arranged to calibrate two cameras with respect to each other. The stereo camera arrangement comprises a first camera, a second camera and a controller, wherein the controller is adapted to receive a first image from the first camera, and receive a second image from a second camera, wherein an overlap is present in both the first image and the second image, and determine at least two candidate points of the first image in the overlap. The controller is further adapted to determine at least two candidate points of the second image in the overlap, and match the candidate points of the first image with the candidate points of the second image and determine pairs of corresponding candidate points. Furthermore, the controller is adapted to calculate a homography of the first camera based on the pairs of corresponding candidate points, and calibrate the first camera by adjusting an intrinsic parameter or an extrinsic parameter of the first camera, based on the calculated homography of the first camera. The controller is further adapted to calculate a homography of the second camera based on the pairs of corresponding candidate points, and calibrate the second camera by adjusting an intrinsic parameter or an extrinsic parameter of the second camera, based on the calculated homography of the second camera.

By determining corresponding candidate points of a first and a second camera, appropriate homographies may be calculated which may be utilized to calibrate the first and second cameras with respect to each other. Thereby, an appropriate calibration may be performed without need to arrange specific reference points in an environment.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The disclosed embodiments will now be described in more detail by means of exemplary embodiments and with reference to the accompanying drawings, in which.

DETAILED DESCRIPTION

The disclosed embodiments will now be described more fully hereinafter with reference to the accompanying drawings, in which certain embodiments are shown. The teachings of this disclosure may, however, be embodied in many different forms and should not be construed as limited to the embodiments set forth herein; rather, these embodiments are provided by way of example so that this disclosure will be thorough and complete, and will fully convey the scope of the disclosure to those skilled in the art. Like numbers refer to like elements throughout.

Although the disclosed embodiments herein will focus on a camera in a vehicle, such as a bus or any other transportation vehicle, the teachings herein may also be applied to other situations. The disclosed method and system may be applied for any situation where cameras of stereo camera arrangement can be calibrated. The method and system disclosed herein is not limited to be applied for any specific type of objects, e.g. passengers and animals.

With reference to the FIGS. 2a and 2b, which are schematic illustrations of a situation in a vehicle, some principles of a proposed solution for calibration of a stereo camera arrangement in a vehicle will now be described, in accordance with one exemplifying embodiment.

Figure 1A:
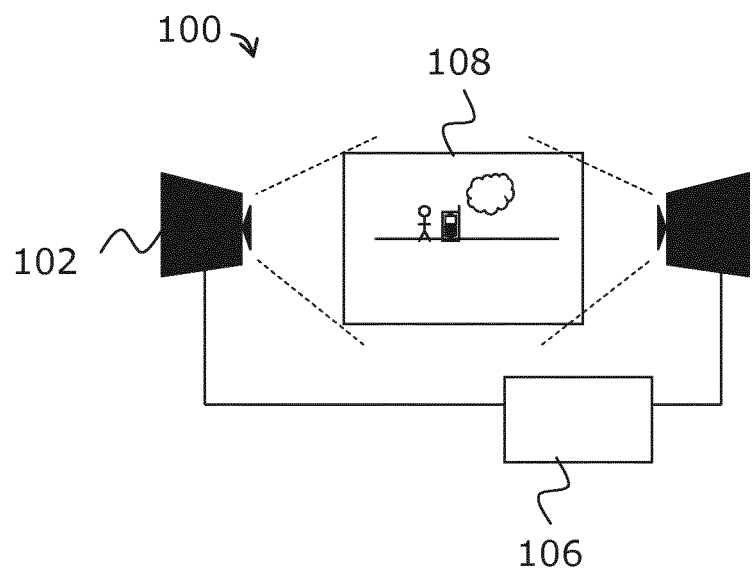
FIGS. 1a-b is schematic views of an arrangement in accordance with the existing art.
Figure 1B:
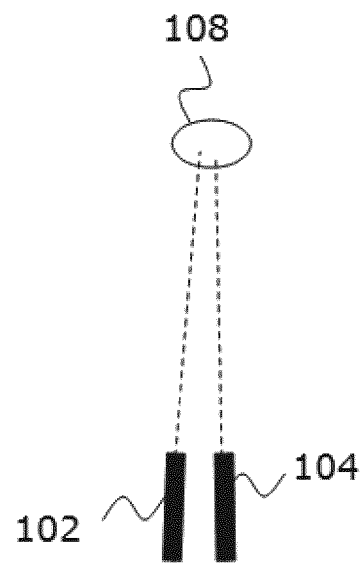
Figure 2A:
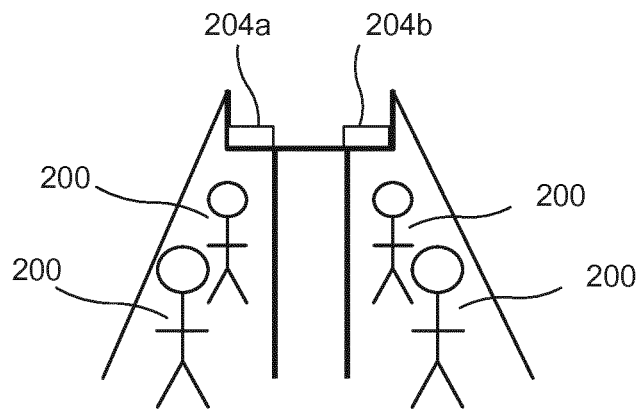
FIGS. 2a-b is schematic views of an arrangement according to an embodiment of the teachings herein.

FIG. 2a illustrates four standing passengers 200 in a public transportation vehicle (not referred to). In this exemplified embodiment, the public transportation vehicle is a bus.

A vehicle is a highly specific environment which poses extreme requirements on the camera arrangement being arranged therein. Cameras arranged in a vehicle will require regular adjustments due to the harsh physical conditions and the calibration process must thus be easily performed. Due to the risk of theft and vandalism of cameras in a vehicle (such as for example a bus) it is beneficial if the cameras are cheap and non-complex.

Figure 2B:
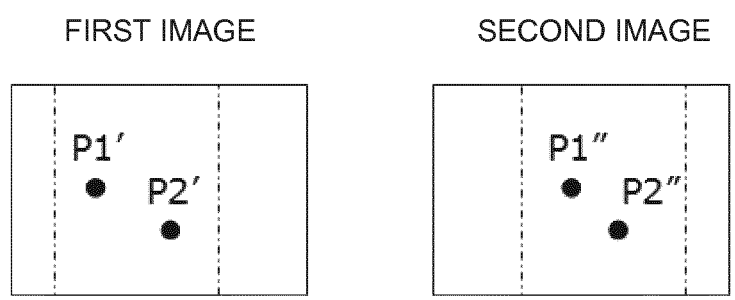

FIG. 2b is a schematic illustration of two images which are captured with two different cameras 204a, 204b. In this illustrative example, the first image, resulting from the first camera 204a, comprises the candidate points P1' and P2'. The first and second image overlaps each other, which is illustrated by the dash-dotted lines. Correspondingly, the second image, resulting from the second camera 204b, comprises the candidate points P1" and P2" and the overlap. It should be noted that the actual number of candidate points might be much higher than the two shown in FIG. 2b.

Each one of the cameras 204a, 204b captures a respective image of the interior of the bus and an image captured by the first camera 204a overlaps an image captured by the second camera 204b. In the overlap a plurality of distinctive candidate points will be determined for each of the images. In this embodiment, corners are detected by analysing the images by a so called Harris algorithm. However, the disclosed concept is not limited to any specific type of candidate or interest points or algorithm. Within the disclosed concept, any suitable type of candidate or interest points may be applied when appropriate. For instance, intersections or other suitable points may be utilised as candidate points. The candidate or interest points may be detected by applying any of the following interest point detection algorithms on the images: Harris corner detection algorithm, SIFT (Scale-Invariant Feature Transform), SURF (Speeded-Up Robust Features), FAST (Features from Accelerated Segment Test), BRIEF (Binary Robust Independent Elementary Features), ORB (Oriented FAST and Rotated BRIEF), etc. The result of the application of the interest point detection algorithm results in a plurality of detected corners or intersections. For instance intersections of poles and handrails in the bus will be detected as corners according to the Harris algorithm and be determined to be candidate points P1', P2', P1", P2". However, it should be noted that the number of candidate points P1', P2', P1", P2" may vary.

Candidate points P1', P2' determined from the first image, i.e. from the first camera 204a, will be matched with candidate points P1", P2" of the second image, i.e. from the second camera 204b. Based on the matching pairs of points P1'/P1", P2'/P2" a homography will be calculated. A homography of the first camera 204a is a matrix $[H_l]$, and is related to camera parameters of the first camera 204a and the second camera 204b as follows:

$$H_l = K_{nl} R_l (K_{ol})^{-1},$$

where $H_l$ is the homography of the left camera, $K_{ol}$ is the old camera matrix for the left camera and includes intrinsic parameters of the left camera, $R_l$ is the rotation matrix of the left camera and includes extrinsic parameters for the left camera, and $K_{nl}$ is the new camera matrix for the left camera. In this embodiment, the first camera 204a is the left camera and the second camera 204b is the right camera. However, the disclosed concept may be applied also for adjusting the right camera, as will be described further on. When calibrating the right camera instead, the right camera is the first one 204a and the left camera is the second one 204b.

Correspondingly, $H_r$ is calculated as:

$$H_r = K_{nr} R_r (K_{or})^{-1}, \text{ for the corresponding parameters.}$$

Typically, $K_{nl}$ is selected as $K_{nl}=K_{nr}$, and $K_{ol}$ and $K_{or}$, respectively, are at least partly known. The respective homographies are applied on each pixel of the respective images.

Typical intrinsic parameters of the cameras are: focus length, skew coefficients, and principal point. Typical extrinsic parameters are: rotation around any of the x-axis, y-axis, or z-axis, translation along any of the x-axis, y-axis or z-axis. Hence, adjusting an intrinsic parameter or an extrinsic parameter of a camera may comprise adjusting any of: a camera orientation parameter, a focus length parameter, a skew coefficient parameter, a principal point parameter, a rotation parameter, and a translation parameter.

In the exemplified embodiment in FIG. 2b, there are only two candidate points in each image P1', P2', P1", P2". However, it is common to have a plurality of candidate points P1', P2', P1", P2". Calculating the homographies comprises to find the matrixes $[H_l], [H_r]$ which minimises an error function. In this embodiment the Sampson error is determined by utilising RANSAC (Random sample consensus). However, the disclosed concept is not limited to apply Sampson error and RANSAC, any other suitable functions and algorithms may alternatively be utilised instead when appropriate, for instance absolute difference along the y-axis, $L_1$-norm, $L_2$-norm, number of inliers, truncated $L_1$-norm, truncated $L_2$-norm, or any suitable combination thereof.

Thus, by implementing functionality to detect significant points, e.g. corners, the calculation unit will be enabled to determine candidate points without having specific calibration reference markers applied in the bus. The calibration reference markers may be stickers or paint markers. Such reference markers may be lost, damaged or even removed by passengers, which may result in an unsatisfying calibration of the cameras.

Figure 3:
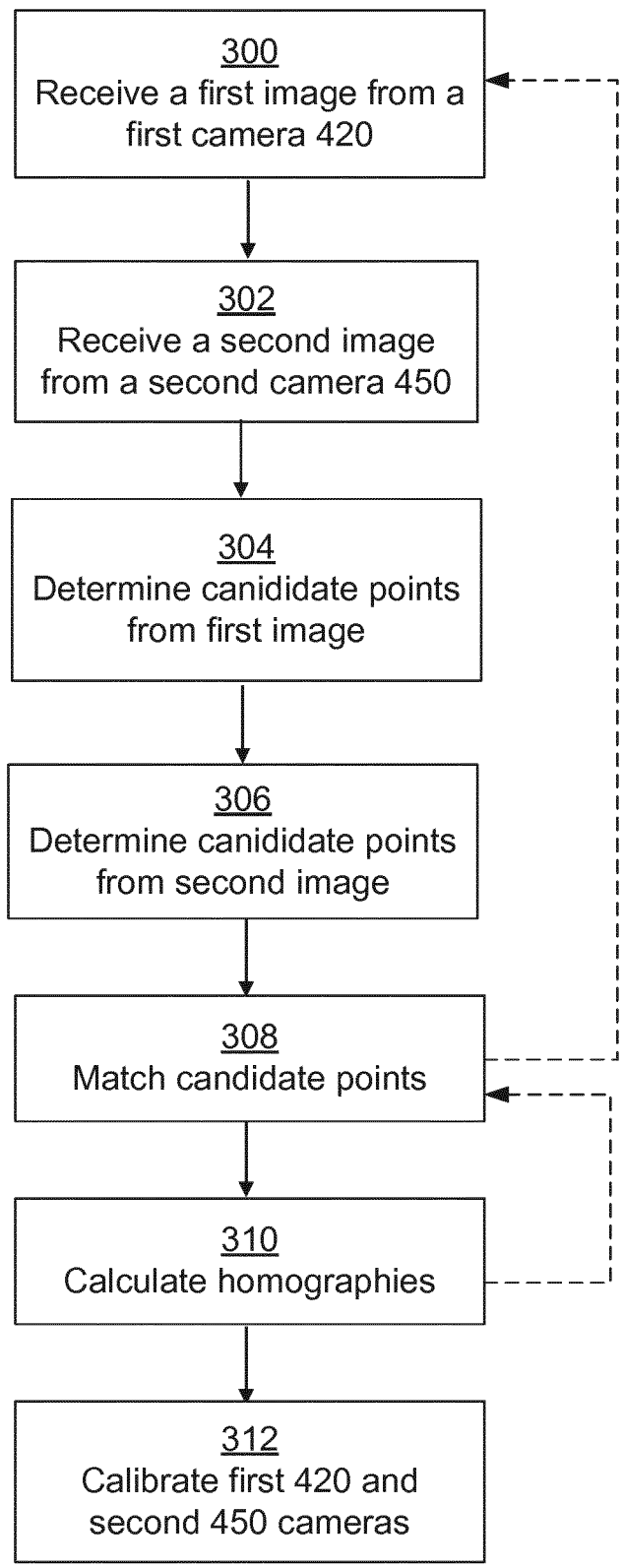
FIG. 3 is a flowchart of a method according to an embodiment of the teachings herein.

With reference to FIG. 3, which is a schematic flow chart, a method performed by a controller for calibrating a first 204a and a second camera 204b with respect to each other will now be described in accordance with one exemplifying embodiment.

The first image captured with the first camera 204a and the second image captured with the second camera 204b is received, action 300 and 302 respectively.

In a following action 304, candidate points of the first image are determined by utilising the Harris algorithm on the first image. Correspondingly, candidate points of the second image are determined in the action 306. Suitable candidate points are typically realised as corners or intersections, e.g. between poles and handrails, or at windows, etc.

In a subsequent action 308, the determined candidate points are matched into candidate point pairs. Then in a following action 310, appropriate candidate point pairs are selected and the selected candidate point pairs are utilised to calculate a homography which minimises a suitable error function, e.g. the Sampson function. The selection of candidate point pairs is typically performed by selecting point pairs from different regions of the overlap, which improves the appropriateness of the homographies.

It is to be noted that the actions 300, 302, 304, 306, 308 may optionally be repeated until an appropriate number of pairs of candidate point are found. Furthermore, the action 310 of may also be repeated until a satisfying homography is calculated. The homography may be based on either the first matched candidate points, or matched candidate points of the repeated actions 300-308.

In a final action 312, the calculated homography will then be utilised to calibrate the first and second camera 204a, 204b. Each camera 204a, 204b is calibrated by adjusting at least one intrinsic or at least one extrinsic parameter of the camera that is calibrated in accordance with the homography. It is to be noted that the disclosed concept is not limited to adjustment of any specific number of intrinsic or extrinsic parameters, and that any suitable combination of intrinsic and extrinsic parameters may be adjusted within the disclosed concept.

The cameras 204a, 204b could be re-calibrated multiple times. This is beneficial in the event of disturbances, e.g. originating from shaking, that may affect the cameras during transport, e.g. when arranged in a vehicle.

In the above described embodiments, two cameras 204a, 204b of a stereo camera arrangement 470 are calibrated with respect to each other. However, the disclosed concept is not limited to be applied for only two cameras. Alternatively, the actions formulas and algorithms may be modified and applied for any suitable plurality of cameras in an arrangement.

Regarding the above described embodiments, the method steps or actions are relatively un-complex and do not require any substantial amount of calculation capacity to provide a proper homography(ies). Thereby the limited calculation capacity which normally is comprised in ordinary digital cameras may be applied for calibrating digital cameras of a stereo camera arrangement.

Figure 4A:
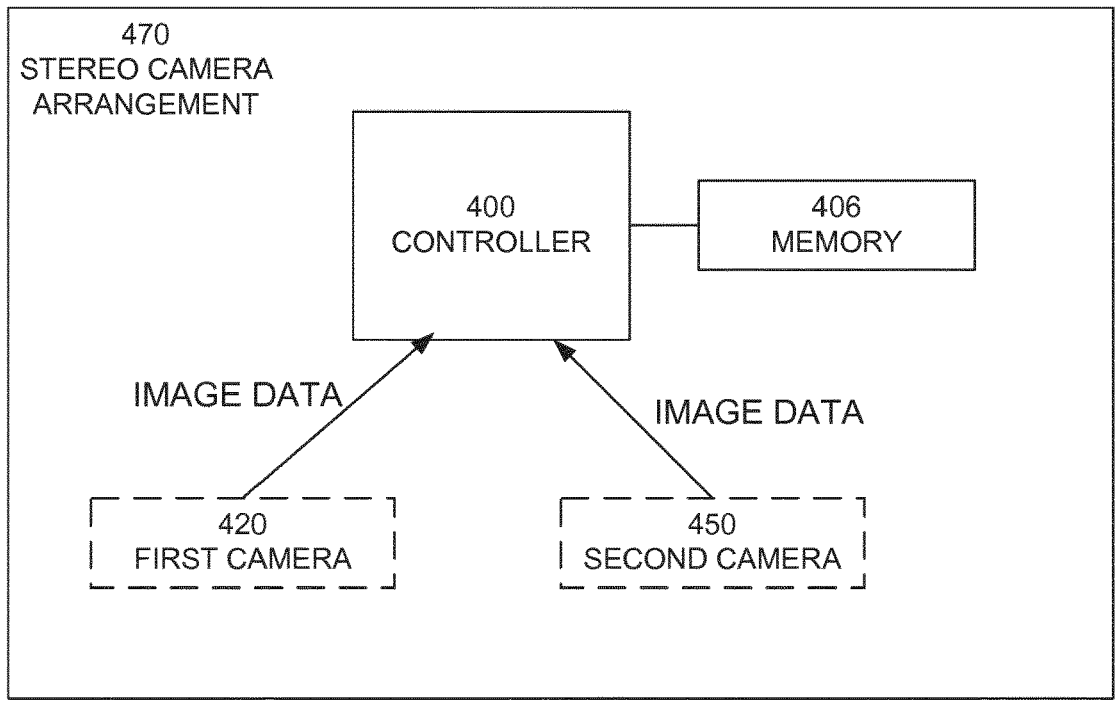
FIGS. 4a-c are schematic block diagrams of a calibration unit according to an embodiment of the teachings herein.
Figure 4B:
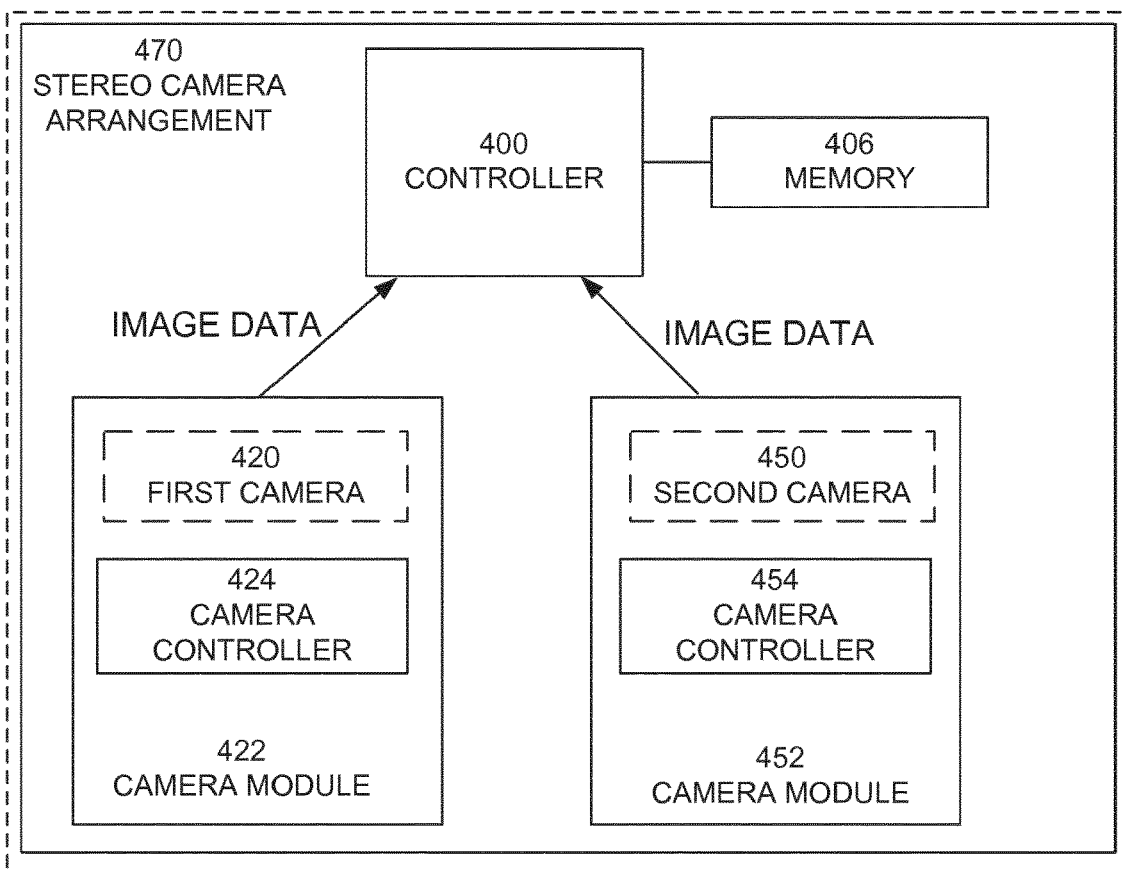
Figure 4C:
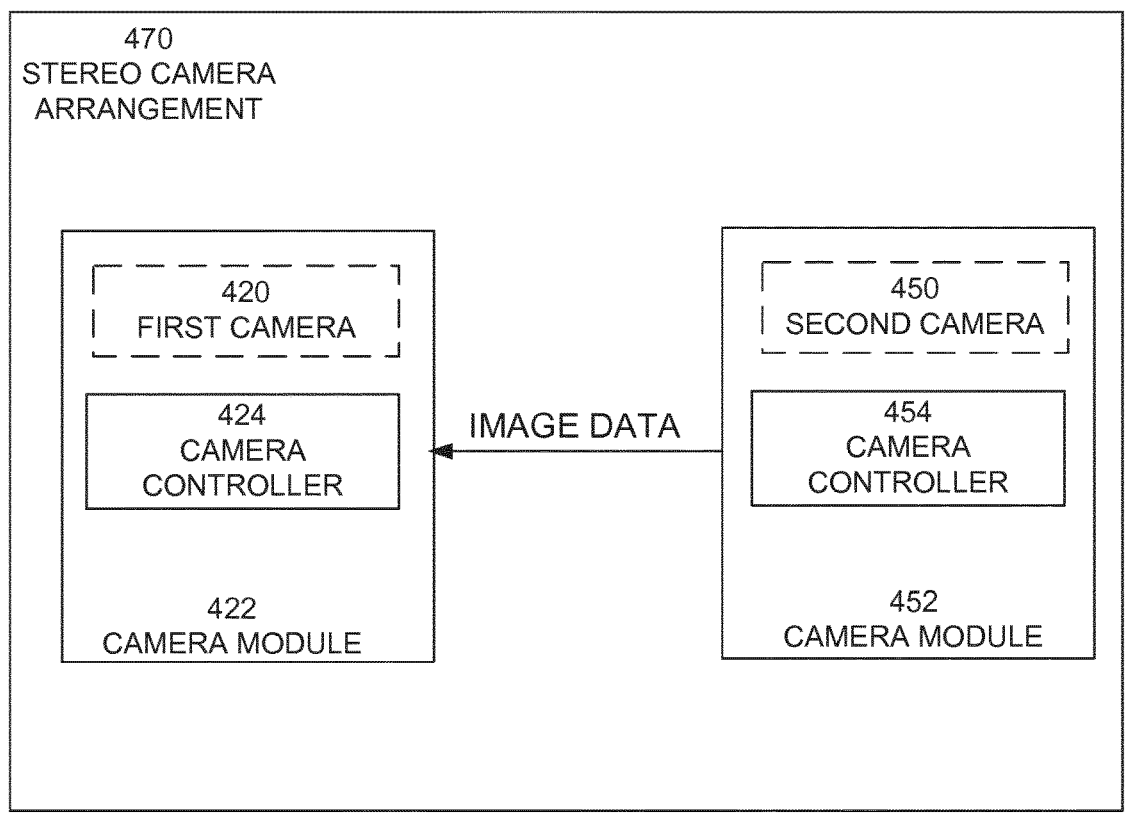

FIG. 4a-c shows a schematic view of the general structure of a stereo camera arrangement 470 which will now be described in accordance with some exemplifying embodiments.

The stereo camera arrangement 470 shown in FIG. 4a comprises a controller 400 configured to calibrate a first 420 and a second 450 camera based on an image stream received from the cameras 420, 450. The controller 400 is arranged to receive the images which have been captured by the first 420 and the second 450 camera.

The controller 400 is further arranged to determine candidate points from the received first and second images, respectively. These determinations have been disclosed above in conjunction with some other embodiments, and will therefore not be further discussed herein.

Moreover, the controller 400 is arranged to match candidate points of the first and second images into pairs of corresponding candidate points and calculate a homography for the cameras which minimises an error function. Also this matching has been described in more detail above.

The controller 400 is further adapted to adjust intrinsic parameters and/or extrinsic parameters for the first camera 420 based on the calculated homography of the first camera 420, as described above. Furthermore, the controller 400 is adapted to also adjust intrinsic parameters and/or extrinsic parameters for the second camera 450 based on the calculated homography of the second camera 450.

Optionally, the controller 400 of the above described embodiments may comprise further components or units arranged to provide appropriate functionality. For instance, suitable storage units 406, such as a memory, may be arranged to store: determined candidate points, pairs of candidate points, homographies, or typical settings for intrinsic or extrinsic parameters, etc. The memory 406 may be implemented using any commonly known technology for computer-readable memories such as ROM, RAM, SRAM, DRAM, CMOS, FLASH, DDR, SDRAM or some other memory technology.

With reference to FIG. 4b, a stereo camera arrangement 470 is illustrated in accordance with one exemplifying embodiment. The cameras 420, 450 of this embodiment differ from the above described embodiment in that the two cameras 420, 450 are replaced with two camera modules 422, 452. Each camera module 422, 452 comprises a camera 420, 450 and a camera controller 424, 454. Each camera controller 424, 454 is equipped with image processing functionality e.g. for pre-processing captured images with respect to light conditions, sharpness, etc. It should be noted that the calibration of the at least one camera 420, 450 occurs by the controller 400 in the stereo camera arrangement 470 as been described in more detail above.

The stereo camera arrangement 470 may be housed in one common housing or it may be comprised of more than one separate unit, possibly housed in different housings. This is indicated by the double outline (dashed/full) in FIG. 4b.

With reference to FIG. 4c, a stereo camera arrangement 470 is illustrated in accordance with one exemplifying embodiment. The stereo camera arrangement 470 comprises two camera modules 422, 452 each comprising a camera 420, 450 and a camera controller 424, 454. Each camera controller 424, 454 is equipped with image processing functionality e.g. for pre-processing captured images with respect to light conditions, sharpness, etc. In this exemplified embodiment, the first 420 camera is calibrated with respect to the second camera 450. The image data captured by the second camera 450 is sent to the first camera 420 where the data is utilised to calibrate the first camera 420 by adjusting at least one intrinsic or at least one extrinsic parameter of the first camera 420.

As stated above, the stereo camera arrangement 470 may be implemented as two separate cameras 420, 450 and a separate controller 400, or two cameras 420, 450, where the controller 422, 454 is inserted or integrated within one of the cameras 420, 450. Alternatively, the stereo camera arrangement 470 may be implemented as a stereo camera entity which comprises two cameras 420, 450 and the controller 400.

Regarding the embodiments described in conjunction with the FIGS. 4a-c, the controller 400 may further be adapted to sort out duplicated candidate points before calculating the homograpy(ies). Regarding some of the above described embodiments, the arrangements and methods are schematically described and illustrated in order to simplify the understanding. However, a designer understands that the arrangements may be alternatively implemented within the disclosed concept when put into practice. For instance, any components and modules of one of the arrangements or elements may be arranged in another arrangement or element, or that further arrangements or elements may be arranged.

Figure 5:
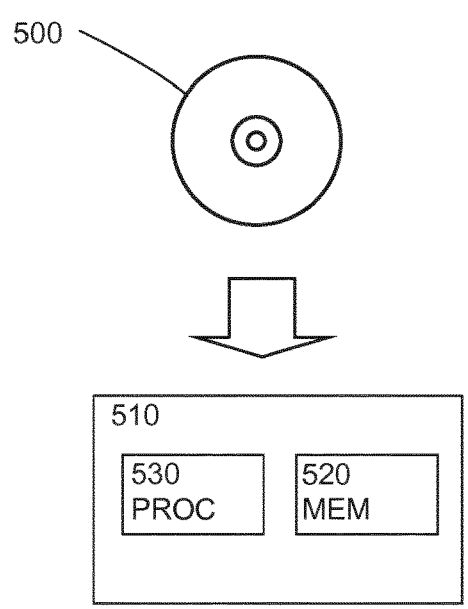
FIG. 5 is a schematic block diagram of a computer program product, according to possible embodiments.

According to some exemplifying embodiments, a computer program product comprises a computer readable medium such as, for example, a diskette or a CD-ROM (Compact Disc Read Only Memory) as illustrated by 500 in FIG. 5. The computer readable medium may have stored thereon a computer program comprising program instructions. The computer program may be loadable into a data-processing unit 530, which may, for example, be comprised in a communication network node 510. When loaded into the data-processing unit 530, the computer program may be stored in a memory 520 associated with or integral to the data-processing unit 530. According to some embodiments, the computer program may, when loaded into and run by the data-processing unit 530, cause the data-processing unit 530 to execute method steps according to, for example, the method shown in FIG. 3.

It is to be noted that the arrangements of the described exemplifying embodiments are described in a non-limiting manner. Typically, a designer may select to arrange further units and components to provide appropriate operation of the communication network node, within the described concept, e.g. further processors or memories. Moreover, physical implementations of the proposed arrangements may be performed alternatively within the disclosed concept. For instance, functionality of a specific illustrated unit or module may be implemented in another suitable unit or module when put into practice. The disclosed calibration unit is also not limited to be arranged in any of the cameras, and may alternatively be arranged as a separate unit.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present disclosure has been described above with reference to specific embodiments, it is not intended to be limited to the specific form set forth herein. Rather, the disclosure is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A method of calibrating a first and a second camera with respect to each other, the method comprising:
   receiving a first image from the first camera;
   receiving a second image from the second camera, wherein both the first image and the second image comprises an overlap;
   determining one or more candidate points of the first image in the overlap;
   determining one or more candidate points of the second image in the overlap;
   matching the candidate points of the first image with the candidate points of the second image and determining pairs of corresponding candidate points;
   calculating a homography of the first camera based on the pairs of corresponding candidate points;
   calculating a homography of the second camera based on the pairs of corresponding candidate points;
   adjusting an intrinsic parameter of the first camera, based on the calculated homography of the first camera, to calibrate the first camera with respect to the second camera;

adjusting an intrinsic parameter of the second camera, based on the calculated homography of the second camera, to calibrate the second camera with respect to the first camera, wherein the intrinsic parameter of the first camera and the intrinsic parameter of the second camera are both adjusted;

adjusting an extrinsic parameter of the first camera, based on the calculated homography of the first camera, to calibrate the first camera with respect to the second camera; and adjusting an extrinsic parameter of the second camera, based on the calculated homography of the second camera, to calibrate the second camera with respect to the first camera.

2. The method according to claim 1, wherein determining the one or more candidate points in the overlap of the first image comprises utilising a feature detection algorithm on the first image, and wherein determining the one or more candidate points in the overlap of the second image comprises utilising the feature detection algorithm on the second image.

3. The method according to claim 2, wherein the feature detection algorithm is a corner detection algorithm.

4. The method according to claim 1, wherein matching the candidate points comprises utilising a correlation function on the determined candidate points of the first image and the determined candidate points of the second image, and determining pairs of corresponding candidate points from the first image and the second image when the correlation function is maximised for the candidate points of the first image and candidate points of the second.

5. The method according to claim 1, wherein calculating at least one of the first and second camera's homography comprises utilising an error function on the determined pairs of corresponding candidate points, and the homography is determined when the error function is minimised for the determined pairs of corresponding candidate points.

6. The method according to claim 1, wherein adjusting an intrinsic parameter or an extrinsic parameter of at least one of the first and second cameras comprises adjusting any of: a camera orientation parameter, a focus length parameter, a skew coefficient parameter, a principal point parameter, a rotation parameter, and a translation parameter.

7. The method according to claim 1, the method being performed by a controller arranged in a stereo camera arrangement.

8. A stereo camera arrangement to calibrate two cameras with respect to each other, wherein the stereo camera arrangement comprises:
a first camera;
a second camera; and
a controller adapted to:
receive a first image from the first camera, and receive a second image from the second camera, wherein an overlap is present in both the first image and the second image;
determine at least two candidate points of the first image in the overlap;
determine at least two candidate points of the second image in the overlap;
match the candidate points of the first image with the candidate points of the second image and determine pairs of corresponding candidate points;
calculate a homography of the first camera based on the pairs of corresponding candidate points;
calculate a homography of the second camera based on the pairs of corresponding candidate points;

adjust an intrinsic parameter of the first camera, based on the calculated homography of the first camera, to calibrate the first camera with respect to the second camera;
adjust an intrinsic parameter of the second camera, based on the calculated homography of the second camera, to calibrate the second camera with respect to the first camera, wherein the intrinsic parameter of the first camera and the intrinsic parameter of the second camera are both adjusted;
adjust an extrinsic parameter of the first camera, based on the calculated homography of the first camera, to calibrate the first camera with respect to the second camera; and
adjust an extrinsic parameter of the second camera, based on the calculated homography of the second camera, to calibrate the second camera with respect to the first camera.

9. The stereo camera arrangement according to claim 8, wherein the controller is adapted to determine the one or more candidate points in the overlap of the first image by utilising a feature detection algorithm on the first image, and determine the one or more candidate points in the overlap region of the second image by utilising the feature detection algorithm on the second image.

10. The stereo camera arrangement according to claim 8, wherein the controller is adapted to apply a corner detection algorithm as feature detection algorithm.

11. The stereo camera arrangement according to claim 8, wherein the controller is adapted to match the candidate points by utilising a correlation function on the determined candidate points of the first image and the determined candidate points of the second image, and further adapted to determining pairs of corresponding candidate points from the first image and the second image when the correlation function is maximised for the candidate points of the first image and candidate points of the second.

12. The stereo camera arrangement according to claim 8, wherein the controller is adapted to calculate at least one of the first and second camera's homography by utilising an error function on the determined pairs of corresponding candidate points, and the homography is determined when the error function is minimised for the determined pairs of corresponding candidate points.

13. The stereo camera arrangement according to claim 8, wherein the controller is adapted to adjust the intrinsic parameter or an extrinsic parameter of at least one of the first and second cameras as one or more of: a camera orientation parameter, a focus length parameter, a skew coefficient parameter, a principal point parameter, a rotation parameter, and a translation parameter.

14. A computer program product comprising a non-transitory computer readable storage medium including instructions, which when executed by a device having a processing capability, cause the device to execute instruction, the instructions causing the device to perform operations comprising:
receiving a first image from the first camera;
receiving a second image from the second camera, wherein both the first image and the second image comprises an overlap;
determining one or more candidate points of the first image in the overlap;
determining one or more candidate points of the second image in the overlap;

matching the candidate points of the first image with the candidate points of the second image and determining pairs of corresponding candidate points;
calculating a homography of the first camera based on the pairs of corresponding candidate points;
calculating a homography of the second camera based on the pairs of corresponding candidate points;
adjusting an intrinsic parameter of the first camera, based on the calculated homography of the first camera, to calibrate the first camera with respect to the second camera;
adjusting an intrinsic parameter of the second camera, based on the calculated homography of the second camera, to calibrate the second camera with respect to the first camera, wherein the intrinsic parameter of the first camera and the intrinsic parameter of the second camera are both adjusted;
adjusting an extrinsic parameter of the first camera, based on the calculated homography of the first camera, to calibrate the first camera with respect to the second camera; and
adjusting an extrinsic parameter of the second camera, based on the calculated homography of the second camera, to calibrate the second camera with respect to the first camera.

\* \* \* \* \*